United States Patent
Furukawa

(10) Patent No.: US 11,657,806 B2
(45) Date of Patent: May 23, 2023

(54) INFORMATION OUTPUT SYSTEM AND INFORMATION OUTPUT METHOD

(71) Applicant: TOYOTA JIDOSHA KABUSHIKI KAISHA, Toyota (JP)

(72) Inventor: Daisuke Furukawa, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 17/318,386

(22) Filed: May 12, 2021

(65) Prior Publication Data
US 2022/0036888 A1 Feb. 3, 2022

(30) Foreign Application Priority Data

Jul. 28, 2020 (JP) .............................. JP2020-127308

(51) Int. Cl.
*G10L 15/22* (2006.01)
*G10L 15/18* (2013.01)
*G10L 15/08* (2006.01)

(52) U.S. Cl.
CPC .......... *G10L 15/1815* (2013.01); *G10L 15/22* (2013.01); *G10L 2015/081* (2013.01); *G10L 2015/223* (2013.01)

(58) Field of Classification Search
CPC ......... G10L 15/22; G10L 15/18; G10L 15/00; G10L 15/065; G10L 15/08; G10L 15/1815; G10L 15/1822; G10L 15/183; G10L 15/19; G10L 15/24; G10L 15/26; G10L 15/30; G10L 2015/0631–0638; G10L 2015/086; G10L 2015/088; G10L 2015/221–228

USPC ............. 704/257, 270.1, 275, 231, 235, 251
See application file for complete search history.

(56) References Cited

U.S. PATENT DOCUMENTS

| 9,218,819 B1* | 12/2015 | Stekkelpak ............. G10L 15/07 |
| 2009/0228264 A1* | 9/2009 | Williams .............. H04M 3/493 704/9 |
| 2010/0138402 A1* | 6/2010 | Burroughs .......... G06F 16/3344 707/723 |
| 2018/0090132 A1 | 3/2018 | Ikeno et al. |
| 2018/0158459 A1 | 6/2018 | Yamagami et al. |
| 2019/0013008 A1* | 1/2019 | Kunitake ................ G10L 15/08 |

FOREIGN PATENT DOCUMENTS

| JP | 2011-210043 A | 10/2011 |
| JP | 2013-196019 A | 9/2013 |
| JP | 2018-054790 A | 4/2018 |
| JP | 2018-092582 A | 6/2018 |

* cited by examiner

*Primary Examiner* — Qi Han
(74) *Attorney, Agent, or Firm* — Sughrue Mion, PLLC

(57) ABSTRACT

An information output system includes a speech acquisition unit configured to acquire a speech of a user, a recognition processing unit configured to recognize the content of the acquired speech of the user, and an output processing unit configured to output a question to the user and to perform processing for outputting a response to the content of the speech of the user who has answered the question. The output processing unit is configured to derive a user's positive degree based on the content of the speech of the user who has answered the question and to determine guidance information to be output to the user based on the derived positive degree.

4 Claims, 4 Drawing Sheets

INFORMATION OUTPUT SYSTEM AND INFORMATION OUTPUT METHOD

CROSS-REFERENCE TO RELATED APPLICATION

This application claims priority to Japanese Patent Application No. 2020-127308 filed on Jul. 28, 2020, incorporated herein by reference in its entirety.

BACKGROUND

1. Technical Field

The present disclosure relates to a technique for outputting information to a user.

2. Description of Related Art

Japanese Unexamined Patent Application Publication No. 2018-54790 (JP 2018-54790 A) discloses a voice interaction system that interacts with a user by voice. This voice interaction system stores a plurality of interaction scenarios in advance and, even when a user's speech is a short word, responds according to the interaction scenario.

SUMMARY

When the system and a user are in a conversation, the user may make an ambiguous speech that does not show a clear intention. In such a case, it is not easy to respond to the ambiguous speech of the user.

The present disclosure provides a technique for outputting guidance information that will serve as a useful reference for the user.

A first aspect of the present disclosure relates to an information output system including a speech acquisition unit, a recognition processing unit, and an output processing unit. The speech acquisition unit is configured to acquire the speech of a user. The recognition processing unit is configured to recognize the content of the acquired speech of the user. The output processing unit is configured to output a question to the user and to perform processing for outputting a response to the content of the speech of the user who has answered the question. The output processing unit is configured to derive a user's positive degree based on the content of the speech of the user who has answered the question and to determine guidance information to be output to the user based on the derived positive degree.

A second aspect of the present disclosure relates to an information output method. This method includes acquiring a speech of a user, recognizing the content of the acquired speech of the user, acquiring a plurality of pieces of guidance information according to the recognized content of the speech of the user, and outputting a question to the user and outputting a response to the content of the speech of the user who has answered the question. The response to the content of the speech of the user includes guidance information determined based on a user's positive degree of the speech of the user who has answered the question.

According to the present disclosure, it is possible to provide a technique for outputting guidance information that will serve as a useful reference for the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
FIG. 1A is a diagram showing an information output system in an embodiment.
FIG. 1B is a diagram showing the information output system in the embodiment.

FIG. 1A and FIG. 1B are diagrams showing an information output system in an embodiment. FIG. 1A and FIG. 1B show images displayed on a display mounted on a vehicle. The information output system, with the function to converse with a driver, outputs information to the driver using images and voices.

FIG. 1A and FIG. 1B show how a character displayed on the display outputs information to the driver. A character is one form of an agent 2 that exchanges information with a driver mainly through interaction. The agent 2 may interact with the driver not only by an image but also by a voice. The agent 2 provides information on traveling by a voice and/or an image to assist the driver in driving and, at the same time, interacts with the driver about daily-life interaction that is not related to the traveling.

In FIG. 1A, the driver speaks "I'm hungry" and, in response to the content of the speech, the agent 2 outputs the content that recommends a meal to the driver by speaking "Do you want to go home after eating ramen?" In addition, in this speech, the agent 2 asks whether the meal the driver wants to eat is ramen. The agent 2 recognizes the content of the driver's speech and responds according to the content of the speech.

In FIG. 1B, the agent 2 outputs the content of shop guidance information on three ramen shops. For example, when the driver speaks "Yes" to the question from the agent 2 shown in FIG. 1A, the agent 2 provides the guidance information on ramen shops located near the driver.

In this way, the agent 2 converses with the driver and provides the driver with useful guidance information. In addition, the information output system outputs a question to the driver, derives the driver's positive degree for the question, and outputs guidance information according to the driver's positive degree. For example, when the driver speaks "Yes" in response to the question "Do you want to go home after eating ramen?" output from the agent 2, the information output system outputs the guidance information on ramen shops. On the other hand, when the driver speaks "Are there other restaurants?", the information output system outputs the guidance information on non-ramen shops. The information output system analyzes the driver's speech for the question, derives the positive degree, and outputs the guidance information according to the driver's positive degree for providing useful information to the driver.

Figure 2:
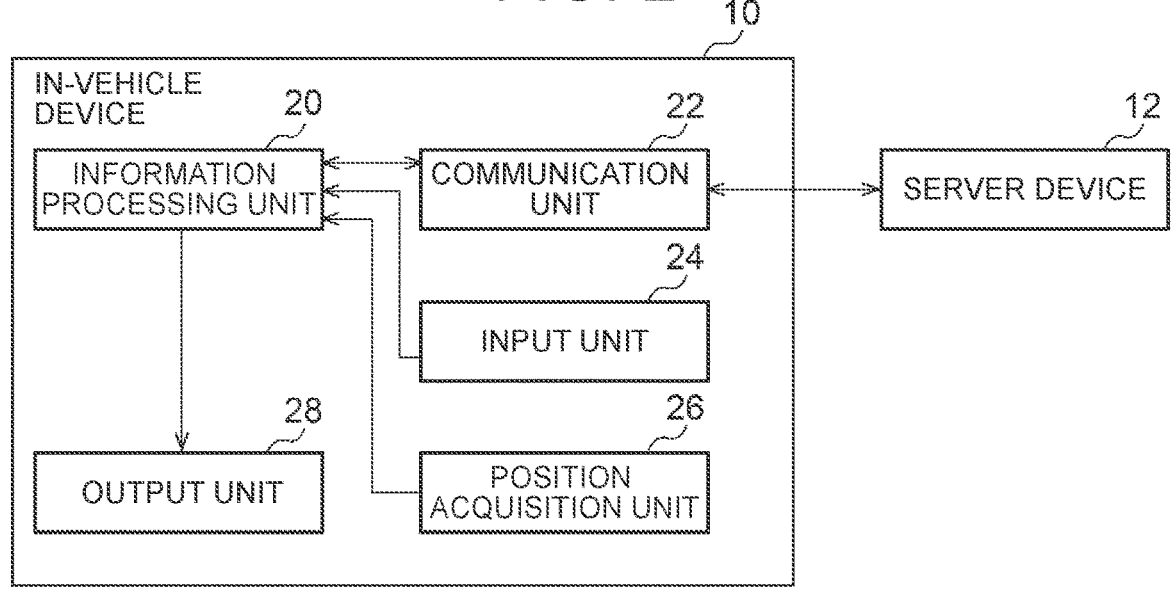
FIG. 2 is a diagram showing a functional configuration of the information output system.

FIG. 2 shows a functional configuration of an information output system 1. In FIG. 2 and in FIG. 3 that will be described later, each component described as a functional block, which performs various processing, can be implemented as a hardware component such as a circuit block, a memory, or other LSIs and can be implemented as a software component such as a program loaded in memory. Therefore, it is understood by those skilled in the art that these functional blocks can be implemented in various ways by hardware only, by software only, or by a combination thereof. The implementation method is not limited to any one of them.

The information output system 1 includes an in-vehicle device 10 and a server device 12. The server device 12, provided in a data center, can communicate with the in-vehicle device 10. The server device 12 stores guidance information therein for providing it to the in-vehicle device 10. The guidance information, such as the information on a shop, includes the shop name, address, and what is sold at the shop. The guidance information may be advertising information for products and services. The guidance information is categorized by genre and includes the tag information indicating a genre. For example, restaurants are categorized into genres such as ramen, Chinese food, Japanese food, curry, and Italian food. A plurality of pieces of tag information may be attached to one piece of shop information.

The in-vehicle device 10 includes an information processing unit 20, a communication unit 22, an input unit 24, a position acquisition unit 26, and an output unit 28. The communication unit 22 communicates with the server device 12. A vehicle ID is attached to the information sent from the communication unit 22 to the server device 12.

The input unit 24 receives an input of the driver who is a user. The input unit 24, such as a microphone, a touch panel, and an in-vehicle camera, receives a driver's voice input, a driver's motion input, and a driver's operation input. The position acquisition unit 26 acquires the position information on the vehicle using the satellite positioning system. A time stamp is attached to the position information on the vehicle.

The output unit 28, either a speaker or a display, outputs information to the driver. The speaker of the output unit 28 outputs the voice of the agent 2, and the display of the output unit 28 displays the agent 2 and guidance information. The display used as the output unit 28 is provided on the dashboard between the driver's seat and the front passenger seat.

The information processing unit 20 analyzes a driver's speech that is input to the input unit 24 and causes the output unit 28 to output a response to the driver's speech so that the agent 2 can carry out conversation with the driver.

Figure 3:
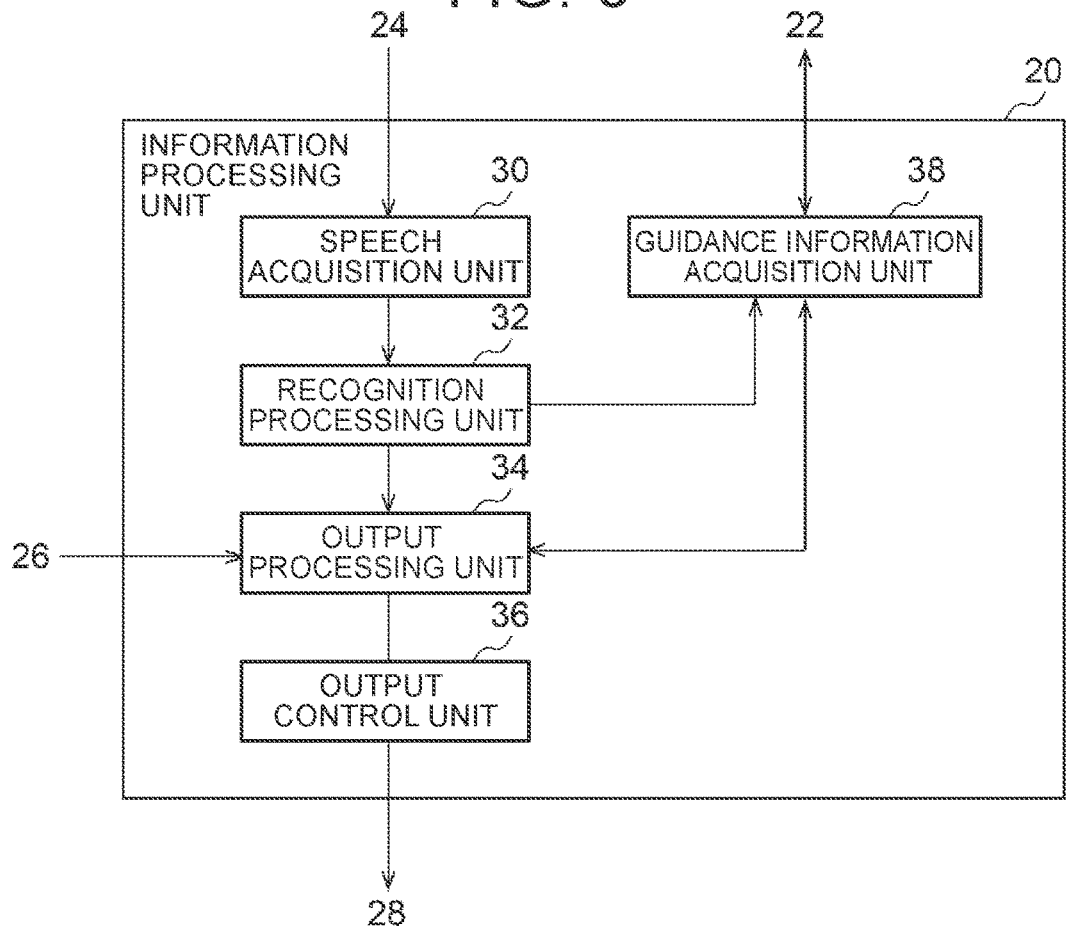
FIG. 3 is a diagram showing a functional configuration of an information processing unit.

FIG. 3 is a diagram showing a functional configuration of the information processing unit 20. The information processing unit 20 includes a speech acquisition unit 30, a recognition processing unit 32, an output processing unit 34, an output control unit 36, and a guidance information acquisition unit 38.

The speech acquisition unit 30 acquires a driver's speech that is input to the input unit 24. A driver's speech is an acoustic signal. The speech acquisition unit 30 may acquire driver's operation information that is input to the input unit 24.

The recognition processing unit 32 recognizes the content of a driver's speech acquired by the speech acquisition unit 30. The recognition processing unit 32 performs voice recognition processing that converts a driver's speech into text and, then, performs language recognition processing that understands the content of the text.

The guidance information acquisition unit 38 acquires guidance information from the server device 12 in response to a driver's speech recognized by the recognition processing unit 32. For example, when the driver speaks "I want to eat ramen", the guidance information acquisition unit 38 acquires the guidance information with the tag information of "restaurant" or "ramen" or acquires the guidance information including the word "ramen." The guidance information acquisition unit 38 may acquire the shop information on a shop located around the vehicle based on the position information on the vehicle.

The output processing unit 34 generates a response to a driver's speech recognized by the recognition processing unit 32. The output processing unit 34, with the guidance function that provides guidance information to the driver, may perform the guidance function when a trigger is detected. The program that performs the guidance function is executed according to a predetermined branch tree. This program terminates the guidance function after the guidance information is output. When a trigger is detected in a driver's speech, the output processing unit 34 turns on the guidance flag and starts performing the guidance function.

The output processing unit 34 derives a driver's positive degree for a question output to the driver and, based on the derived positive degree, determines the guidance information to be output to the driver. The output processing unit 34 generates a search condition based on the driver's positive degree, narrows down the guidance information based on the generated search condition, and outputs the narrowed down guidance information.

For example, to the question "Do you want to go home after eating ramen?" that is output from the agent 2, the driver may answer with an ambiguous answer such as "Hmm" or "Ramen mm". To such an ambiguous answer, it may be difficult to respond appropriately. In such a case, when the agent 2 repeats the same question to the driver's ambiguous answer, the driver will find it unpleasant. To address such a problem, the output processing unit 34 derives the driver's positive degree for a question and, based on the derived positive degree, determines the guidance information. This makes it possible to provide useful guidance information according to the driver's intention.

The positive degree of a speech is divided into five, "positive", "slightly positive", "intermediate", "slightly negative", and "negative", with one of them derived as the positive degree. In this way, the output processing unit 34 outputs a question that can be answered positively or negatively, obtains a driver's answer to the question, and derives the positive degree from the answer. In addition, the output processing unit 34 can output a question asking the driver's favorite genre and, based on the answer of the driver who has answered the question, derive the positive degree of that genre.

In response to the question saying "Do you want to go home after eating ramen?", answers such as "Yes" and "OK" are "positive", answers such as "Not bad" and "Ramen will do" are "slightly positive", answers such as "Hmm" and "Ramen mm" are "intermediate", answers such as "Ramen?" and "I ate it yesterday" are "slightly negative", and answers such as "I will eat it in my house" and "I don't like it" are "negative." The program for deriving the positive degree may be learned using the machine learning method.

The question saying "Do you want to go home after eating ramen?" is a question that can be answered positively or negatively and, at the same time, is a question that asks a driver's favorite food genre. When the driver answers with a "positive" answer to the question saying "Do you want to go home after eating ramen?" given by the agent 2, the output processing unit 34 outputs the guidance information on ramen shops. On the other hand, when the driver answers with a "negative" answer, the output processing unit 34 outputs the guidance information on non-ramen shops.

In addition, when the driver answers with a "slightly positive", "intermediate", or "slightly negative" answer, the output processing unit 34 outputs the restaurant guidance information on ramen shops and non-ramen shops. When the driver answers with a "slightly positive", "intermediate", or "slightly negative" answer, the output processing unit 34 determines the proportion of restaurant guidance information between ramen shops and non-ramen shops according to the positive degree. For example, the proportion of ramen shop guidance information is larger when the driver answers with a "slightly positive" answer than when the driver answers with a "slightly negative" answer. That is, based on the positive degree of the driver who has answered a question regarding the driver's favorite food genre, the output processing unit 34 determines the proportion of driver's preferred guidance information to be included in a plurality pieces of guidance information that is output to the driver. Outputting the guidance information determined based on the positive degree of a driver's speech in this way makes it possible to provide useful information to the driver.

The positive degree of the user may be derived with a score from 0 to 100. The more positive, the closer the value is to 100, and the more negative, the closer the value is to 0. The output processing unit 34 may determine the proportion of genres included in the guidance information according to the positive degree of the user, with a larger proportion of guidance information for a genre having a relatively higher positive degree.

The output processing unit 34 may detect the driver's expression for deriving the driver's positive degree based not only on a driver's speech but also on an image captured by the in-vehicle camera. Based on the processing result of the output processing unit 34, the output control unit 36 controls the output unit 28 to cause it to output the voice of the agent 2 while displaying the agent 2. With reference to a new drawing, the following describes the response processing of the output processing unit 34.

Figure 4:
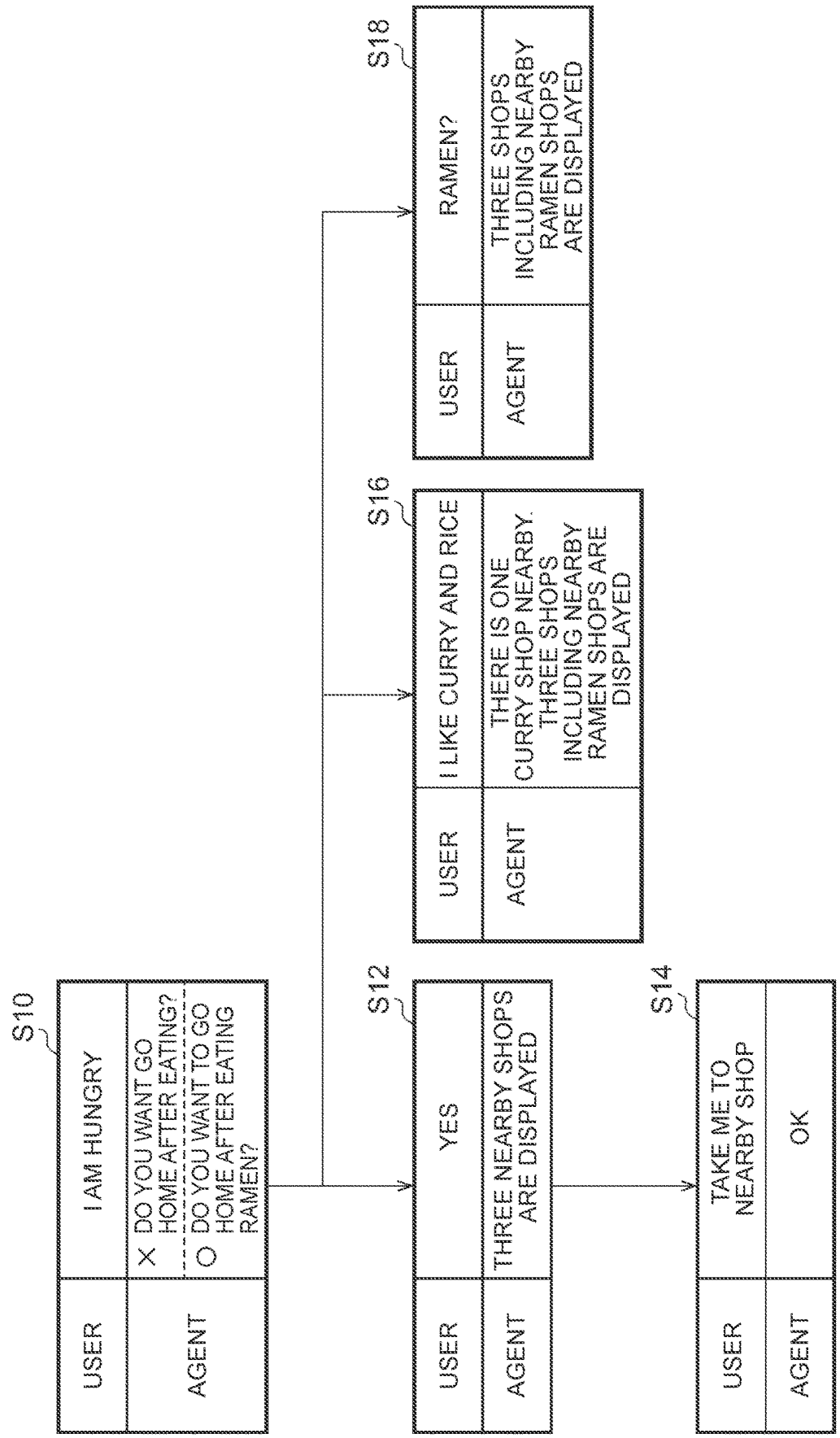
FIG. 4 is a diagram showing the response processing of an agent that is performed for driver's speeches.

FIG. 4 is a diagram showing the response processing of the agent 2 for driver's speeches. In the example in FIG. 4, it is assumed that the driver is returning home and is having a conversation with the agent 2 while driving. In step 10, the driver speaks "I am hungry" and, in response, the agent 2 outputs a voice and an image saying "Do you want to go home after eating ramen?" Upon receiving the driver's speech "I am hungry", the output processing unit 34 turns on the restaurant guidance flag and starts outputting the restaurant shop guidance information to the driver.

The output processing unit 34 determines to output a response recommending the driver's favorite "ramen" based on the driver's preference information or the behavior history information. This question is a question that can be answered positively or negatively. If neither the driver's preference information nor the behavior history information is retained, the output processing unit 34 determines to simply ask "Do you want go home after eating?" The output control unit 36 controls the output of the output unit 28 according to the determination made by the output processing unit 34.

In step 12, the driver answers with "Yes." The output processing unit 34 derives the positive degree of the driver's speech and, in step 12, derives that the positive degree is high and is "positive." The output processing unit 34 narrows the search target down to restaurants based on the driver's speech, and instructs the guidance information acquisition unit 38 to acquire the shop information on the restaurants. The guidance information acquisition unit 38 acquires the shop information on the restaurants located around the vehicle based on the driver's speech and the position information on the vehicle. The output processing unit 34 receives the shop information acquired by the guidance information acquisition unit 38, narrows the shop information on the restaurants down to the shop information on ramen shops, and determines to output the guidance information on ramen shops such as that shown in FIG. 1B. According to the determination made by the output processing unit 34, the output control unit 36 causes the output unit 28 to output "Three nearby shops are displayed" together with three pieces of ramen shop information.

In step 14, the driver speaks "Take me to a nearby shop", the agent 2 outputs "OK", and the in-vehicle device 10 guides a route to ramen shop A. In this way, the information output system 1 can provide guidance information useful for the driver.

In step 16, the driver answers with "I like curry and rice." The output processing unit 34 derives that the positive degree of driver's speech for the question is "negative". The guidance information acquisition unit 38 searches for restaurants located around the vehicle based on the driver's speech and on the position information on the vehicle. The guidance information acquisition unit 38 cannot acquire the information on curry shops located around the vehicle, but acquires the information on restaurant shops including ramen shops. Upon receiving the result acquired by the guidance information acquisition unit 38, the output processing unit 34 narrows down the received shop information and finds one curry shop. Since there are few driver's favorite food shops, the output processing unit 34 determines to output the information on shops other than the information on curry shops. Based on the determination made by the output processing unit 34, the output control unit 36 causes the agent 2 to output "There is one curry shop nearby. Three shops including nearby ramen shops are displayed." As a result, the information on curry shops and, in addition, the information on ramen shops are displayed though the driver does not like ramen this time. In step 16, if the guidance information acquisition unit 38 can acquire a predetermined number of pieces of curry shop information, the output processing unit 34 determines to output the predetermined number of pieces of curry shop information.

As described above, when the number of pieces of guidance information on driver's favorite food shops is smaller than the predetermined number, the output processing unit 34 determines to output the guidance information on shops that the driver does not like. The guidance information on shops that the driver does not like, when output in this way, makes it possible to increase the number of driver's options. After step 16, the provided shop guidance information may be output as in step 14. The number of pieces of guidance information that is output to the driver may be three, and the predetermined number may be three. Since it is difficult for the driver to read the guidance information displayed on the display while driving, it is preferable that the agent 2 output the guidance information at least by voice. When the shop guidance information is output to the driver by voice, the driver cannot remember the information on many shops. Therefore, the guidance information is output only for three shops.

The output processing unit 34 generates a search condition for narrowing down the guidance information based on the positive degree of the user. The search condition includes an exclusion condition generated based on a user's negative answer. An exclusion condition is a search condition that narrows down the guidance information by excluding the guidance information corresponding to the exclusion condition. For example, when the exclusion condition is "ramen", the guidance information on the "ramen" genre is excluded. The output processing unit 34 narrows down the guidance information based on the exclusion condition. When the number of pieces of narrowed guidance information is equal to or larger than the predetermined number, the output processing unit 34 determines to output the predetermined number of pieces of guidance information. On the other hand, when the number of pieces of narrowed guidance information is smaller than the predetermined number, the output processing unit 34 determines to output the predetermined number of pieces of guidance information by not using the exclusion condition, that is, by adding the guidance information excluded by the exclusion condition. In this way, when the number of pieces of guidance information is small, the output processing unit 34 does not use the exclusion condition but outputs the guidance information including that on a genre denied by the driver.

The output processing unit 34 narrows down the guidance information using a search condition generated based on the driver's positive degree. When the number of pieces of narrowed down guidance information is equal to or smaller than the predetermined number, the output processing unit 34 outputs the guidance information by adding the guidance information extracted by not using at least a part of the search condition. For example, when the number of pieces of guidance information narrowed down using "Pizza" and "Italian food" is equal to or smaller than the predetermined number, the output processing unit 34 outputs the guidance information by adding the guidance information extracted by not using "Pizza" but using "Italian food" only.

In step 18, the driver answers with an ambiguous answer by saying "Ramen?" The output processing unit 34 derives that the driver's positive degree for the question is "intermediate" in step 18. The positive degree "intermediate" is derived when the driver responds neither positively nor negatively. The guidance information acquisition unit 38 acquires the shop information on the restaurants located around the vehicle based on the driver's speech and on the position information on the vehicle. The output processing unit 34 narrows the shop information down to two pieces of shop information in the order of nearest distance to the vehicle position and determines to output the resulting two pieces of shop information together with the shop information on the nearest ramen shop. As a result, the shop information on the ramen shop and the shop information on non-ramen shops are output. According to the determination made by the output processing unit 34, the output control unit 36 causes the output unit 28 to output "Three shops including nearby ramen shop are displayed." In this way, based on the positive degree of the driver who has answered a question regarding the driver's favorite food genre, the output processing unit 34 determines the guidance information to be output to the driver. This makes it possible to provide information that meets the driver's intention included in a conversation with the driver.

When the driver's positive degree for a question is negative, the output processing unit 34 may not output guidance information or may turn off the guidance flag without outputting the guidance information. The guidance information may be not only restaurant shop information but also product information such as recommended books and recommended clothes.

Figure 5:
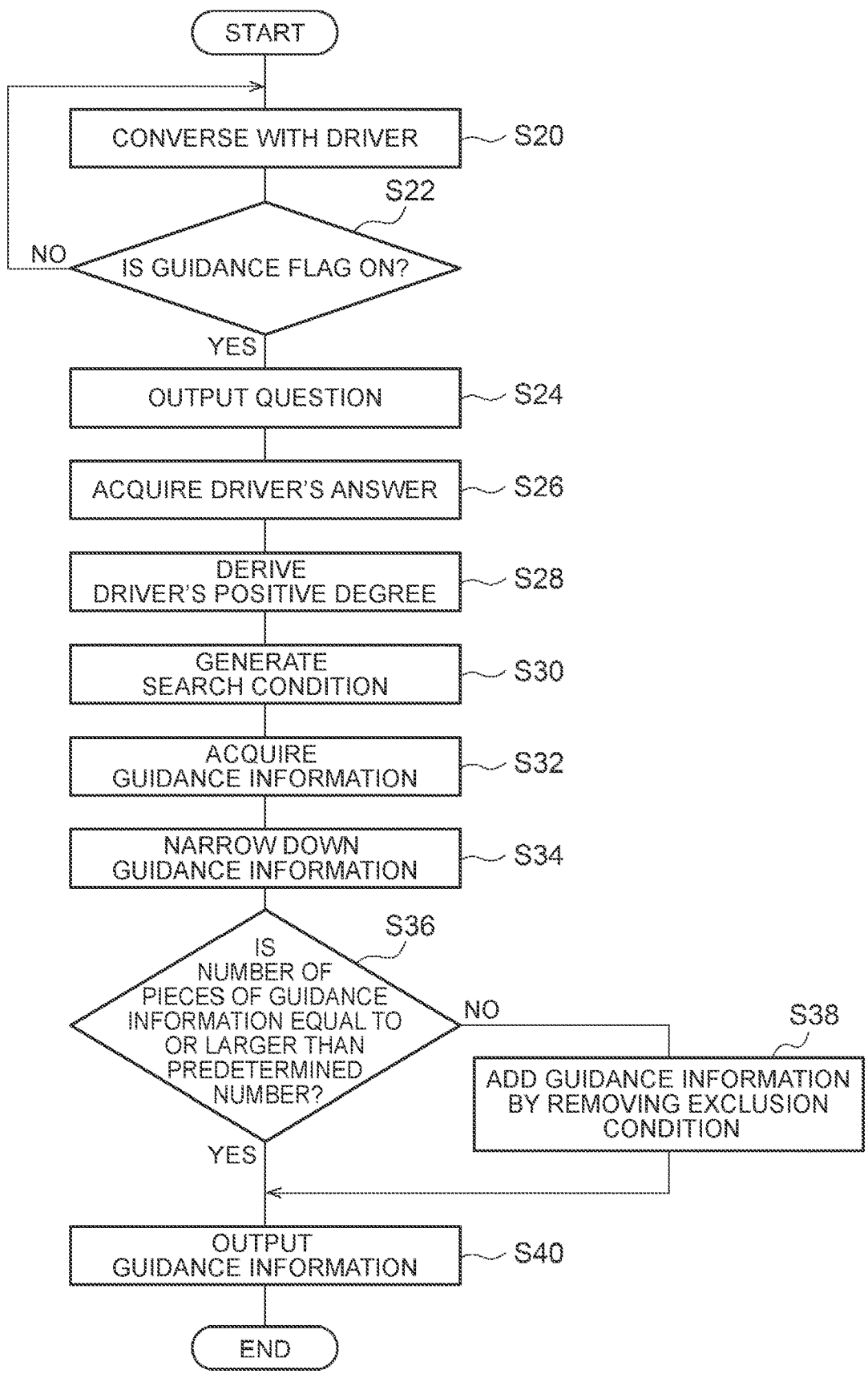
FIG. 5 is a flowchart showing the processing for outputting guidance information.

FIG. 5 is a flowchart showing the processing for outputting guidance information. The in-vehicle device 10 controls the agent 2 so that the agent 2 will converse with the driver (S20). The output processing unit 34 monitors whether the guidance flag is turned on based on a driver's speech (N in S22).

When it is detected that the guidance flag is turned on based on a driver's speech (Y in S22), the output processing unit 34 outputs a question that can be answered positively or negatively in order to narrow down the guidance information (S24).

The speech acquisition unit 30 acquires the answer of the driver who has answered the question (S26), and the recognition processing unit 32 analyzes the driver's answer to recognize the meaning of the answer. Based on the recognition result of the driver's answer, the output processing unit 34 derives the driver's positive degree (S28) and, based on the derived driver's answer and its positive degree, generates a search condition for the guidance information (S30).

The guidance information acquisition unit 38 acquires guidance information from the server device 12 based on the position information on the vehicle (S32). The output processing unit 34 narrows down the guidance information, acquired by the guidance information acquisition unit 38, based on the search condition (S34).

When the number of pieces of narrowed guidance information is smaller than the predetermined number (N in S36), the output processing unit 34 determines to extract additional guidance information by removing the exclusion condition, to add the additional guidance information to the guidance information to increase the number of pieces of guidance information to the predetermined number (S38), and to output the guidance information (S40). In this way, when the number of pieces of guidance information is small, outputting the narrowed-down guidance information together with the excluded guidance information can increase the number of driver's options.

When the number of pieces of narrowed guidance information is equal to or larger than the predetermined number (Y in S36), the output processing unit 34 determines to output the predetermined number of pieces of guidance information (S40).

It should be noted that the embodiments are merely an example, and it is understood by those skilled in the art that various modifications are possible by combining components in various ways and that such modifications are also within the scope of the present disclosure.

Though the in-vehicle device 10 mounted on a vehicle outputs guidance information in the embodiment, the present disclosure is not limited to this mode. For example, a user's mobile terminal device may have the function of the in-vehicle device 10 and output guidance information.

Furthermore, though the in-vehicle device 10 acquires guidance information from the server device 12 in the embodiment, the present disclosure is not limited to this mode. Instead, the in-vehicle device 10 may hold the guidance information in advance. In addition, though the in-vehicle device 10 performs the speech recognition processing, the present disclosure is not limited to this mode and the server device 12 may perform the speech recognition processing.

What is claimed is:
1. An information output system comprising:
 a speech acquisition unit configured to acquire a speech of a user;
 a recognition processing unit configured to recognize a content of the acquired speech of the user; and an output processing unit configured to output a question to the user and to perform processing for outputting a response to the content of the speech of the user who has answered the question, wherein the output processing unit is configured to derive a user's positive degree based on the content of the speech of the user who has answered the question and to determine guidance information to be output to the user based on the derived positive degree.

2. The information output system according to claim 1, wherein the output processing unit is configured to output the question that can be answered with a positive or negative answer, to derive the user's positive degree based on the content of the speech of the user who has answered the question, to narrow down the guidance information using a search condition generated based on the derived user's positive degree and, when the number of pieces of the narrowed down guidance information is equal to or smaller than a predetermined number, to output the guidance information by adding guidance information extracted without using at least a part of the search condition.

3. The information output system according to claim 2, wherein:

the search condition includes an exclusion condition generated based on a user's negative answer; and the output processing unit is configured to narrow down the guidance information by excluding guidance information corresponding to the exclusion condition and, when the number of pieces of the narrowed guidance information is smaller than the predetermined number, to output the guidance information by adding guidance information extracted without using the exclusion condition.

4. An information output method comprising:

acquiring a speech of a user;

recognizing a content of the acquired speech of the user;

acquiring a plurality of pieces of guidance information according to the recognized content of the speech of the user; and outputting a question to the user and outputting a response to the content of the speech of the user who has answered the question, wherein the response to the content of the speech of the user includes guidance information determined based on a user's positive degree of the speech of the user who has answered the question.

* * * * *